March 15, 1960 R. H. BASKEY 2,928,167
SEAL MATERIAL
Filed June 20, 1958

INVENTOR
RAYMOND H. BASKEY
BY Lawrence I. Field
ATTORNEY

United States Patent Office 2,928,167
Patented Mar. 15, 1960

2,928,167

SEAL MATERIAL

Raymond H. Baskey, Lakewood, Ohio, assignor to Horizons Incorporated, Cleveland, Ohio, a corporation of New Jersey Application June 20, 1958, Serial No. 743,375

4 Claims. (Cl. 29—182.5)

This invention relates to a seal material capable of improved operation at the elevated speeds and temperatures likely to be encountered in present day and future aircraft and other applications. More particularly it relates to compositions of matter and seals prepared from such compositions, adapted to function as portions of a rotary seal assembly, said compositions comprising chromium nitride bonded with nickel and infiltrated with silver.

There are many important applications wherein materials are subjected to rubbing, either continuously or intermittently, and particularly those applications wherein it is difficult or even impossible to provide a lubricant to the contact area. Such applications include inaccessible portions of rotating shafts, for example. The problem is rendered particularly acute in instances in which the surfaces are exposed to high temperatures, and for corrosive environments, and are required to function at high speeds.

In the past, seal materials have been sought which would function in the absence of any external lubrication, possibly through the formation of a stable film on the components wearing against one another—or by other mechanisms not fully understood.

By the present invention there is presented a material suitable for rotating seal components subjected to operation: at temperatures of up to about 1350° F.; at slidinng speeds of up to about 30,000 feet per minute; at loads up to about 14 pounds per square inch gage; and under service conditions wherein no liquid or solid (powder) lubricant could be supplied to the surfaces.

Figure 2:
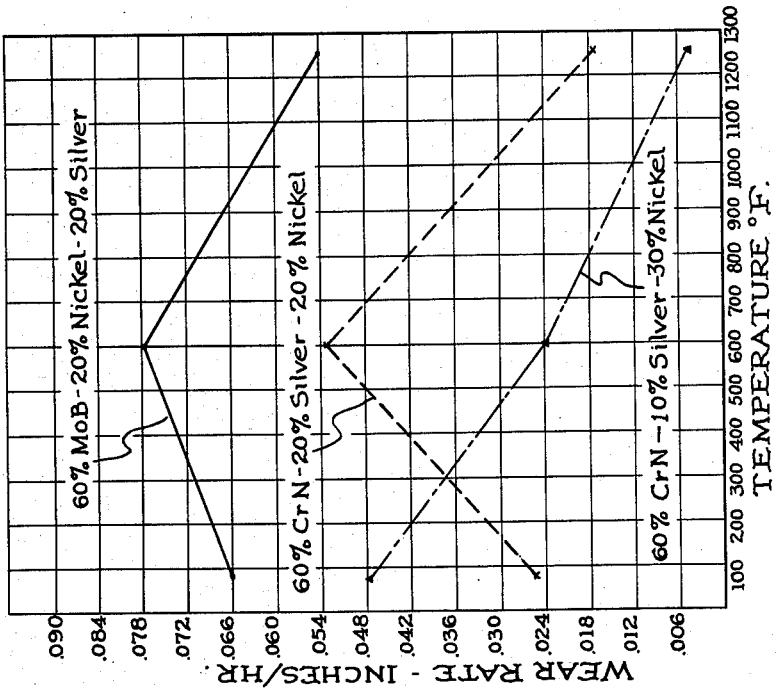
Figure 1:
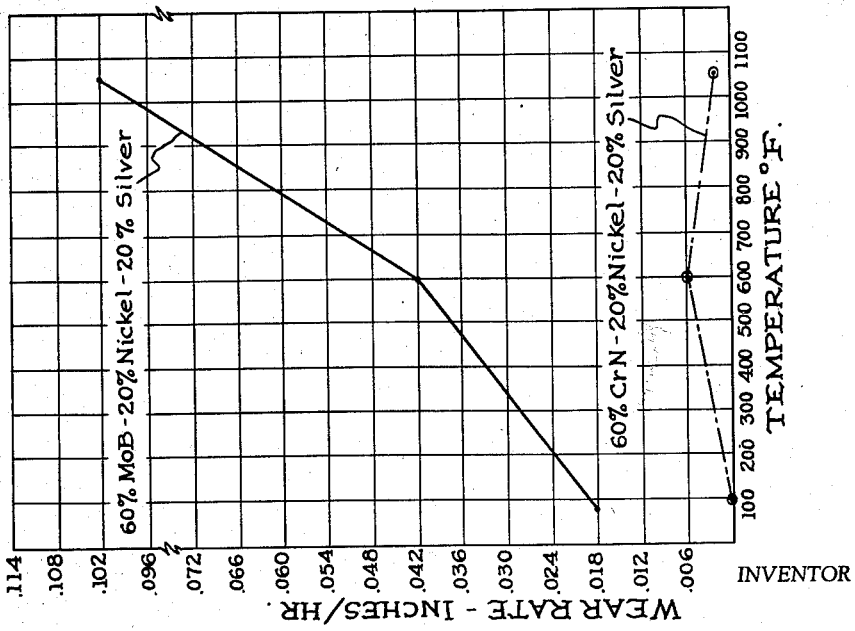

Figures 1 and 2 show graphically, wear rates of certain materials at various test temperatures.

In an earlier copending application for patent, Serial No. 585,859 filed May 18, 1956, and now issued as United States Patent 2,875,510, there are described compositions consisting of between 45% and 82% by weight of nickel, between about 3% by weight and 20% by weight of a refractory boride and the balance essentially all silver or a silver base alloy. Such compositions were found to provide improved bearing materials. In the present invention, instead of a composition predominantly consisting of nickel, there is provided a material, the major proportion of which consists of chromium nitride, and which includes smaller amounts of nickel and silver. Thus, like the earlier disclosed invention, a material with a duplex structure is used to provide a low-friction, low-wear combination, but unlike the earlier application, the harder phase predominates in the compositions of this invention.

In brief, in accordance with the present invention, compositions have been devised consisting primarily of chromium nitride, bonded by means of nickel and including silver as a lubricating phase. These compositions have been tested against special surfaces, as described below at high rates of relative movement, high temperatures and in the absence of any added lubricant. The mating surfaces against which the compositions comprising the present invention were evaluated, consisted of a tool steel and a nickel base Inconel having the following compositions:

| Tool Steel | Inconel |
|---|---|
| W—5.75%. | (Nominal Composition). |
| Cr—4.10%. | Cr—14.17%. |
| Mo—5.25%. | Si—3.0%. |
| Co—9.0%. | Fe—1.5%. |
| V—1.90%. | C—0.4%. |
| C—0.89%. | Balance Ni, except for impurities. |
| Balance Fe, except for impurities. | |

In the above identified copending patent application, the preparation of bearing materials composed of nickel, silver and small amounts of refractory metal carbide, boride or silicide was found to be desirably attained by a powder metallurgy process in which sintering and infiltration with silver were carried out as separate steps. In the present invention it was found that the preparation of seal materials containing between 60% and 90% by weight of chromium nitride, was accomplished satisfactorily only when some silver was included in the compact prior to infiltration, and that when this was done, sintering and infiltration could be accomplished in a single heating step. Attempts to fill all of the pores by adding all of the silver by infiltration of a silver-free preform were ineffectual, possibly because of a reluctance to wet one or more of the other constituents of the composition.

Essentially the procedure found to be suitable consisted of the following steps:

(1) A mixture was formed of chromium nitride, silver powder and nickel powder. The silver was preferably minus 325 mesh (Tyler Standard), the nickel was minus 200 mesh to plus 325 mesh, and the nitride was equally fine. By using such finely divided powders, intimacy of mixing was facilitated.

(2) The mixed powders were placed in a die and pressed at 25 tons per square inch to give a cylindrical specimen. Pressures between 20 tons per square inch and 35 tons per square inch would appear to be equally satisfactory, depending on the specimen size and configuration.

(3) Silver, in an amount somewhat in excess of that required to completely infiltrate the compact to 100% density was placed in physical contact with the compact, and preferably on top of the compact.

(4) The compact and silver were heated at temperatures of about 1150° C. for about two (2) hours under a dry hydrogen atmosphere, to melt the silver and permit it to be absorbed into the pores of the compact.

(5) The resulting specimen was examined for homogeneity, phases, density and appearance and then machined to the desired shape and size.

The resulting material was found to contain 4 phases: a nickel rich-chromium nitride phase having a Vickers hardness of between about 700 and 1000; a chromium nitride phase; a nickel phase; and a silver phase.

For purposes of comparison the wear rate of one chromium nitride composition is shown relative to the wear rate of a similar refractory based composition, in the drawings in which:

Figure 1 is a graph of wear rates against a tool steel at various temperatures and Figure 2 is a graph of wear rates against Inconel at various temperatures.

Other compositions were prepared and tested and it was found that the relative proportions of chromium nitride, nickel and silver could be varied over a substantial range without impairing the effectiveness of the material at elevated temperatures. Thus when employing the procedure described above, compositions were prepared having the following constituents, by weight: between 20% and 30% nickel, between 10% and 20% silver and between about 50 and 70% by weight chromium nitride. The compositions within these ranges were tested and found to possess a desirable combination of physical properties and very low wear rates as compared with other hard materials including borides, nitrides and silicides of the metals of groups V A and VI A of the periodic table.

I claim:

1. A seal material consisting essentially of between 50% and 70% by weight of chromium nitride and from 20% to 30% by weight of nickel and the balance being silver said silver constituting between 10% and 20% by weight of the seal material composition.

2. A composition of matter possessing superior wear resistance properties at elevated temperatures and consisting of between 50 and 70% by weight of chromium nitride, between about 20% and 30% by weight of nickel and the balance substantially all silver said silver comprising from 10% to 20% by weight of the composition.

3. A wear resistant composition of matter consisting essentially of about 60% by weight of chromium nitride and the remainder being equal parts of nickel and silver by weight.

4. A sintered composition of matter composed of between about 20% and 30% by weight of nickel, about 60% of chromium nitride and the balance substantially all silver.

References Cited in the file of this patent

UNITED STATES PATENTS

| | | |
|---|---|---|
| 2,116,399 | Marth | May 3, 1938 |
| 2,851,381 | Hoyer | Sept. 9, 1958 |